United States Patent
Guo et al.

(10) Patent No.: US 10,818,889 B2
(45) Date of Patent: Oct. 27, 2020

(54) BATTERY CAP ASSEMBLY, SECONDARY BATTERY AND BATTERY MODULE

(71) Applicant: CONTEMPORARY AMPEREX TECHNOLOGY CO., LIMITED, Ningde (CN)

(72) Inventors: Zhijun Guo, Ningde (CN); Jie Zhang, Ningde (CN); Taosheng Zhu, Ningde (CN); Peng Wang, Ningde (CN); Guowei Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 268 days.

(21) Appl. No.: 15/981,720

(22) Filed: May 16, 2018

(65) Prior Publication Data
US 2019/0214613 A1   Jul. 11, 2019

(30) Foreign Application Priority Data
Jan. 11, 2018  (CN) ..................... 2018 2 0044608 U (51) Int. Cl.
*H01M 2/04* (2006.01)
*H01M 2/20* (2006.01)
*H01M 2/30* (2006.01)

(52) U.S. Cl.
CPC .......... *H01M 2/0486* (2013.01); *H01M 2/04* (2013.01); *H01M 2/0456* (2013.01); *H01M 2/202* (2013.01); *H01M 2/30* (2013.01)

(58) Field of Classification Search
CPC .... H01M 2/0486; H01M 2/04; H01M 2/0456; H01M 2/202; H01M 2/30
See application file for complete search history.

(56) References Cited

U.S. PATENT DOCUMENTS

| 2014/0308568 A1* | 10/2014 | Kim ........................ | H01M 2/30 |
| | | | 429/158 |
| 2017/0229700 A1* | 8/2017 | Matsumoto ............. | H01M 2/20 |
| 2019/0288269 A1* | 9/2019 | Guen ...................... | H01M 2/34 |

FOREIGN PATENT DOCUMENTS

| CN | 102034954 B | 1/2014 |
| CN | 102110798 B | 4/2015 |

(Continued)

OTHER PUBLICATIONS

Contemporary Amperex Technology Co. Limited, Extended European Search Report, EP18172077.2, dated Jun. 25, 2018, 7 pgs.

*Primary Examiner* — Muhammad S Siddiquee
(74) *Attorney, Agent, or Firm* — Morgan, Lewis & Bockius LLP (57) ABSTRACT

The present disclosure provides a battery cap assembly, a secondary battery and a battery module. The battery cap assembly comprises: a cap plate, including a second terminal hole; a first electrode terminal, at least a part of which protruding above the cap plate; a second electrode terminal, including a second protruding portion protruding above the cap plate and a second base portion connected with the second protruding portion. The first electrode terminal is provided with a protrusion used for welding with a first connecting piece; the second protruding portion is used for welding with a second connecting piece to form a welding portion, and a projection of the welding portion in an up-down direction is positioned in a cross-section of the second base portion. The secondary battery comprises a case, an electrode assembly and the battery cap assembly. The battery module comprises the first connecting piece and the secondary batteries.

12 Claims, 5 Drawing Sheets

(56) References Cited

FOREIGN PATENT DOCUMENTS

| | | |
|---|---|---|
| EP | 2312675 A1 | 4/2011 |
| EP | 2899778 A1 | 7/2015 |

* cited by examiner

BATTERY CAP ASSEMBLY, SECONDARY BATTERY AND BATTERY MODULE

CROSS-REFERENCE TO RELATED APPLICATIONS

The present application claims priority to Chinese patent application No. CN201820044608.8, filed on Jan. 11, 2018, which is incorporated herein by reference in its entirety.

FIELD OF THE PRESENT DISCLOSURE

The present disclosure relates to the field of battery, and particularly relates to a battery cap assembly, a secondary battery and a battery module.

BACKGROUND OF THE PRESENT DISCLOSURE

At present, the secondary batteries of the battery module are generally connected by connecting pieces, and in the prior art, the connecting piece is generally fixed to an electrode terminal of the secondary battery by laser penetration welding; the laser penetration welding needs to have a sufficient welding depth to ensure the welding strength, so a thickness of a part of the electrode terminal protruding above the cap plate is not less than 2 mm, which leads to the electrode terminal and the connecting piece occupying a large space. The connecting piece also can be fixed to the electrode terminal by butt welding in the prior art, however, the butt welding requires that a protrusion should be provided on an upper surface of each of two electrode terminals, the protrusion is used for welding with the connecting piece; because the dimension tolerances of the secondary batteries accumulate, it is difficult to attach the connecting piece to the protrusions of two secondary batteries at the same time, cannot satisfy a requirement of gap between the connecting piece and the protrusion in the process of butt welding, and cannot connect the connecting piece to the protrusion accurately, which will lead to a low welding strength between the connecting piece and the protrusion, and affect the cycle life of the secondary battery.

SUMMARY OF THE PRESENT DISCLOSURE

In view of the problem existing in the background, an object of the present disclosure is to provide a battery cap assembly, a secondary battery and a battery module, which can reduce the height of the battery module and increase the cycle life of the battery module.

In order to achieve the above object, in a first aspect, the present disclosure provides a battery cap assembly, which comprises a cap plate, a first electrode terminal and a second electrode terminal. The cap plate includes a first terminal hole and a second terminal hole. At least a part of the first electrode terminal protrudes above the cap plate. The second electrode terminal includes a second protruding portion protruding above the cap plate and a second base portion connected with the second protruding portion, the second base portion extends into the second terminal hole, a cross-sectional area of the second protruding portion is larger than a cross-sectional area of the second terminal hole. A protrusion is provided on an upper surface of the first electrode terminal and used for welding with a first connecting piece; the second protruding portion is used for welding with a second connecting piece to form a welding portion, and a projection of the welding portion in an up-down direction is positioned in a cross-section of the second base portion. In an embodiment, the second base portion is connected with a bottom surface of the second protruding portion and extends downwardly.

In order to achieve the above object, in a second aspect, the present disclosure provides a secondary battery, which comprises a case, an electrode assembly and the battery cap assembly according to the first aspect of the present disclosure. The case has an opening in a top thereof. The battery cap assembly is fixed to the case and seals the opening of the case. The electrode assembly is received in the case and comprises a first electrode plate and a second electrode plate, the first electrode terminal is electrically connected with the first electrode plate, the second electrode terminal is electrically connected with the second electrode plate.

In order to achieve the above object, in a third aspect, the present disclosure provides a battery module, which comprises a first connecting piece, a second connecting piece and the secondary batteries according to the second aspect of the present disclosure. The first connecting piece includes a first connecting portion and a second connecting portion; the first connecting portion is attached to the upper surface of the first electrode terminal of the battery cap assembly of one secondary battery and welded with the protrusion of the first electrode terminal of the battery cap assembly of the one secondary battery, the second connecting portion is welded with the second protruding portion of the second electrode terminal of the battery cap assembly of another secondary battery to form the welding portion, and the projection of the welding portion in the up-down direction is positioned in the cross-section of the second base portion of the battery cap assembly of the another secondary battery.

The present disclosure has the following beneficial effects: in the battery cap assembly, the secondary battery and the battery module according to the present disclosure, the protrusion and the first connecting portion of the first connecting piece are arranged side by side, so the protrusion will not increase the height of the battery module; at the same time, the first connecting portion of the first connecting piece is fixed to the protrusion by butt welding, and there is no need to fix the first connecting portion of the first connecting piece to the upper surface of the first electrode terminal by laser penetration welding, which can lower the requirement of a thickness of the first electrode terminal, decrease the thickness of the first electrode terminal and save material, reduce the total height of the first electrode terminal and the first connecting piece assembled together, improve the energy density of the battery module. In addition, the second protruding portion of the second electrode terminal is directly connected with the second connecting portion by laser penetration welding, therefore, it only needs to ensure that the first connecting portion of the first connecting piece is fitted with the protrusion in the process of assembling the first connecting piece; even if the dimension tolerances of the secondary batteries accumulate, the second protruding portion of the second electrode terminal will not limit the positioning and assembling of the first connecting piece, which can ensure the connecting strength between the first connecting piece and two secondary batteries, and increase cycle life of the secondary battery and the battery module.

REFERENCE NUMERALS IN FIGURES ARE REPRESENTED AS FOLLOWS 1 secondary battery
  11 battery cap assembly
    111 cap plate
      1111 first terminal hole
      1112 second terminal hole
    112 first electrode terminal
      1121 first protruding portion
      1122 first base portion
    113 second electrode terminal
      1131 second protruding portion
      1132 second base portion
  12 case
  13 electrode assembly
2 first connecting piece
  21 first connecting portion
    211 through-hole
  22 second connecting portion
  23 third connecting portion
3 second connecting piece
M welding portion
P protrusion
S1 upper surface
X transverse direction
Y longitudinal direction
Z up-down direction

DETAILED DESCRIPTION

Hereinafter a battery cap assembly, a secondary battery and a battery module according to the present disclosure will be described in detail in combination with the figures.

Firstly, a battery cap assembly according to a first aspect of the present disclosure will be described.

Referring to FIGS. 1-10, a battery cap assembly 11 according to the present disclosure comprises a cap plate 111, a first electrode terminal 112 and a second electrode terminal 113. The cap plate 111 includes a first terminal hole 1111 and a second terminal hole 1112. At least a part of the first electrode terminal 112 protrudes above the cap plate 111. The second electrode terminal 113 includes a second protruding portion 1131 protruding above the cap plate 111 and a second base portion 1132 connected with a bottom surface of the second protruding portion 1131, the second base portion 1132 extends downwardly and extends into the second terminal hole 1112, a cross-sectional area of the second protruding portion 1131 is larger than a cross-sectional area of the second terminal hole 1112. A protrusion P is provided on an upper surface S1 of the first electrode terminal 112 and used for welding with a first connecting piece 2; the second protruding portion 1131 is used for welding with a second connecting piece 3 to form a welding portion M, and a projection of the welding portion M in an up-down direction Z is positioned in a cross-section of the second base portion 1132. Preferably, the second connecting piece 3 is welded with a top surface of the second protruding portion 1131, the top surface of the second protruding portion 1131 is a plane.

Because the cross-sectional area of the second protruding portion 1131 is larger than the cross-sectional area of the second terminal hole 1112, the second protruding portion 1131 can be clamped above the second terminal hole 1112, thereby avoiding the second protruding portion 1131 of the second electrode terminal 113 passing through the second terminal hole 1112. A sealing member is provided between the second electrode terminal 113 and the second terminal hole 1112.

Because the protrusion P is provided on the upper surface S1 of first electrode terminal 112, when the first electrode terminal 112 of the battery cap assembly 11 needs to be connected with the first connecting piece 2, the protrusion P can be directly fixed to the first connecting piece 2 by butt welding; compared to the traditional laser penetration welding, the butt welding can effectively decrease the heat generated in the process of welding, avoid the sealing member between the first electrode terminal 112 and the cap plate 111 being damaged by high temperature.

When the second electrode terminal 113 of the battery cap assembly 11 needs to be connected with the second connecting piece 3, the second protruding portion 1131 of the second electrode terminal 113 can be directly fixed to the second connecting piece 3 by laser penetration welding. Because the projection of the welding portion M formed by welding the second protruding portion 1131 and the second connecting piece 3 in the up-down direction Z is positioned in the cross-section of the second base portion 1132, and the second base portion 1132 has a large thickness (the second base portion 1132 needs to pass through the second terminal hole 1112, so it has a large thickness), the welding portion M may extend to the second base portion 1132 in the process of laser penetration welding, thereby ensuring welding depth of the laser penetration welding and connecting strength between the second electrode terminal 113 and the second connecting piece 3. The second base portion 1132 can be applied to the laser penetration welding, so a thickness of the second protruding portion 1131 protruding above the cap plate 111 can be decreased, thereby reducing an entire height of the battery cap assembly 11.

The first connecting piece 2 can be used for connecting the first electrode terminal 112 of a first one of the battery cap assemblies 11 and a second electrode terminal 113 of a second one of the battery cap assemblies 11, so as to electrically connect the two battery cap assemblies 11. Similarly, the second connecting piece 3 can be used for connecting the second electrode terminal 113 of the first one of the battery cap assemblies 11 and the first electrode terminal 112 of a third one of the battery cap assemblies 11, so as to electrically connect the two battery cap assemblies 11. The first connecting piece 2 and the second connecting piece 3 are the same.

For example, when one first connecting piece 2 needs to connect the first electrode terminal 112 of the first one of the battery cap assemblies 11 and the second electrode terminal 113 of the second one of the battery cap assemblies 11, the first connecting piece 2 can be connected with the second protruding portion 1131 of the second electrode terminal 113 of the second one of the battery cap assemblies 11 by laser penetration welding, and the welding position is flexible, so it only needs to ensure that the first connecting piece 2 is fitted with the protrusion P of the first one of the battery cap assemblies 11 in the process of assembling the first connecting piece 2, even if there is a dimension tolerance between the two battery cap assemblies 11, the second electrode terminal 113 of the second one of the battery cap assemblies 11 will not limit the positioning and assembling of the first connecting piece 2, which can ensure the connecting strength between the first connecting piece 2 and the two battery cap assemblies 11.

Figure 3:
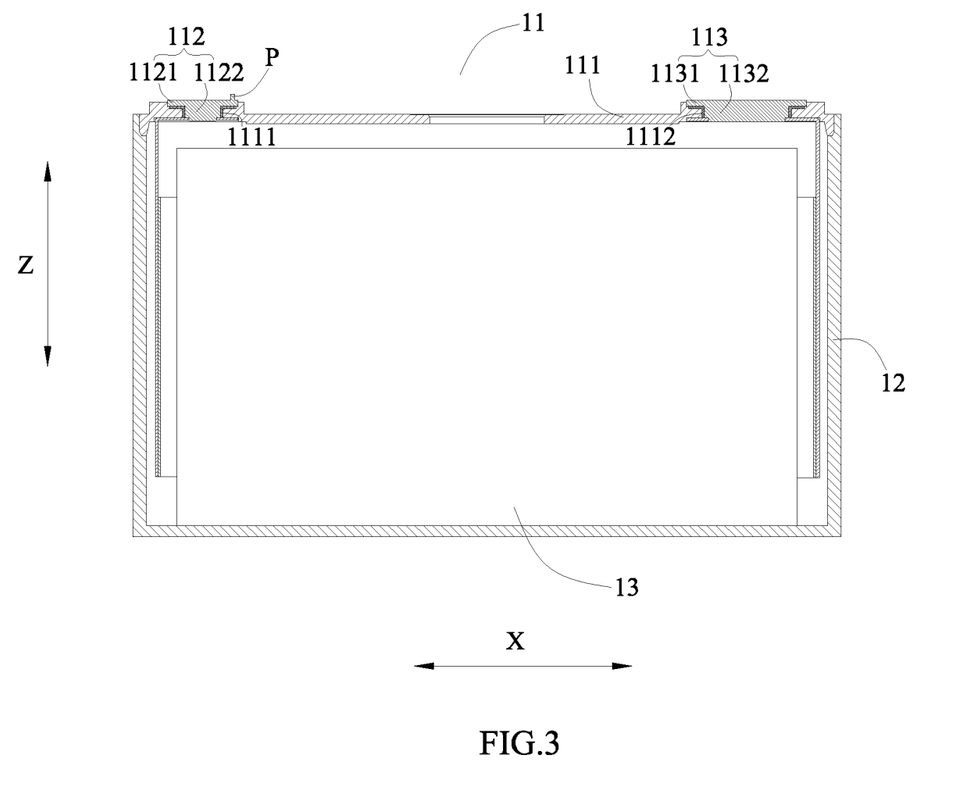
FIG. 3 is a cross sectional view of the secondary battery of FIG. 2.

Referring to FIG. 3, the first electrode terminal 112 includes a first protruding portion 1121 protruding above the cap plate 111 and a first base portion 1122 connected with a bottom surface of the first protruding portion 1121, the first base portion 1122 extends downwardly and extends into the first terminal hole 1111. A top surface of the first protruding portion 1121 is acted as the upper surface S1 of the first electrode terminal 112, a cross-sectional area of the first protruding portion 1121 is larger than a cross-sectional area of the first terminal hole 1111. Because the cross-sectional area of the first protruding portion 1121 is larger than the cross-sectional area of the first terminal hole 1111, the first protruding portion 1121 can be clamped above the first terminal hole 1111, thereby avoiding the first protruding portion 1121 of the first electrode terminal 112 passing through the first terminal hole 1111. Another sealing member can be provided between the first electrode terminal 112 and the first terminal hole 1111.

A cross-section of the first protruding portion 1121, a cross-section of the first base portion 1122, a cross-section of the second protruding portion 1131, the cross-section of the second base portion 1132, a cross-section of the first terminal hole 1111 and a cross-section of the second terminal hole 1112 are cross-sections perpendicular to the up-down direction Z, and the cross-sectional area is area of the section perpendicular to the up-down direction Z.

The cap plate 111 can be made of insulating material.

The first electrode terminal 112 is a negative electrode terminal and made of copper, the second electrode terminal 113 is a positive electrode terminal and made of aluminum, and a cross-sectional area of the first base portion 1122 is smaller than the cross-sectional area of the second base portion 1132.

The battery cap assembly 11 according to the present disclosure is generally applied to a later mentioned secondary battery 1, the second electrode terminal 113 (positive electrode terminal) and the first electrode terminal 112 (negative electrode terminal) can transfer the electric energy of the secondary battery 1 to outside via a positive electrode plate (a later mentioned second electrode plate) and a negative electrode plate (a later mentioned first electrode plate) respectively. Considering electrochemistry, a current collector of the positive electrode plate is formed by aluminum foil, and a current collector of negative electrode plate is formed by copper foil. It is difficult to connect aluminum and copper by laser welding, so in order to ensure the connecting strength between the first electrode terminal 112 and the negative electrode plate and the connecting strength between second electrode terminal 113 and the positive electrode plate, the first electrode terminal 112 is preferably made of copper, the second electrode terminal 113 is preferably made of aluminum.

Because the protrusion P is provided on the upper surface S1 of the first electrode terminal 112, when the first electrode terminal 112 of the battery cap assembly 11 needs to be connected with the first connecting piece 2, the protrusion P can be directly fixed to the first connecting piece 2 by butt welding; compared to the traditional laser penetration welding, the butt welding can effectively decrease the heat generated in the process of welding and avoid the sealing member between the first electrode terminal 112 and the cap plate 111 being damaged by high temperature. In addition, compared to aluminum, copper needs more energy and generates more heat in the process of welding, so the first electrode terminal 112 made of copper needs to choose the butt welding generating few heat. In addition, because electrical resistance of copper is lower than electrical resistance of aluminum, based on the premise that the overcurrent ability of the first electrode terminal 112 and the overcurrent ability of the second electrode terminal 113 are consistent, the cross-sectional area of the first base portion 1122 of the first electrode terminal 112 can be decreased, which can reduce weight of the secondary battery 1 and improve energy density. At the same time, the price of copper is higher than the price of aluminum, so it can save amount of copper and reduce cost.

In the up-down direction Z, both of a thickness of the first protruding portion 1121 and the thickness of the second protruding portion 1131 range from 0.01 mm to 2 mm, preferably, the thickness of the first protruding portion 1121 is equal to the thickness of the second protruding portion 1131. The protrusion P is provided on the first protruding portion 1121, and there is no need to weld the first protruding portion 1121 and the first connecting piece 2, so the first protruding portion 1121 can have a small thickness. Because the projection of the welding portion M formed by welding the second protruding portion 1131 and the second connecting piece 3 in the up-down direction Z is positioned in the cross-section of the second base portion 1132, the second protruding portion 1131 can have a small thickness.

Shape of the protrusion P depends on actual demand, for example, the protrusion P is in the shape of stripe. Specifically, in an embodiment, referring to FIG. 8, a cross-section of the protrusion P is a rectangle and the protrusion P extends along a transverse direction X of the cap plate 111, a width of the protrusion P in a longitudinal direction Y ranges from 0.5 mm to 3 mm. In another embodiment, referring to FIG. 10, the cross-section of the protrusion P is a rectangle and the protrusion P extends along the longitudinal direction Y, a width of the protrusion P in the transverse direction X ranges from 0.5 mm to 3 mm.

The protrusion P also can be provided on different positions of the upper surface S1, for example, the protrusion P can be positioned in a middle part of the upper surface S1 or at an edge of the upper surface S1.

Secondly, a secondary battery according to a second aspect of the present disclosure will be described.

Referring to FIGS. 1-10, a secondary battery 1 according to the present disclosure comprises a case 12, an electrode assembly 13 and the battery cap assembly 11 according to the first aspect of the present disclosure. The case 12 has an opening in a top thereof. The battery cap assembly 11 is fixed to the case 12 and seals the opening of the case 12, the first electrode terminal 112 and the second electrode terminal 113 are fixed to the cap plate 111. The electrode assembly 13 is received in the case 12 and comprises the first electrode plate and the second electrode plate, the first electrode terminal 112 is electrically connected with the first electrode plate, the second electrode terminal 113 is electrically connected with the second electrode plate.

Figure 2:
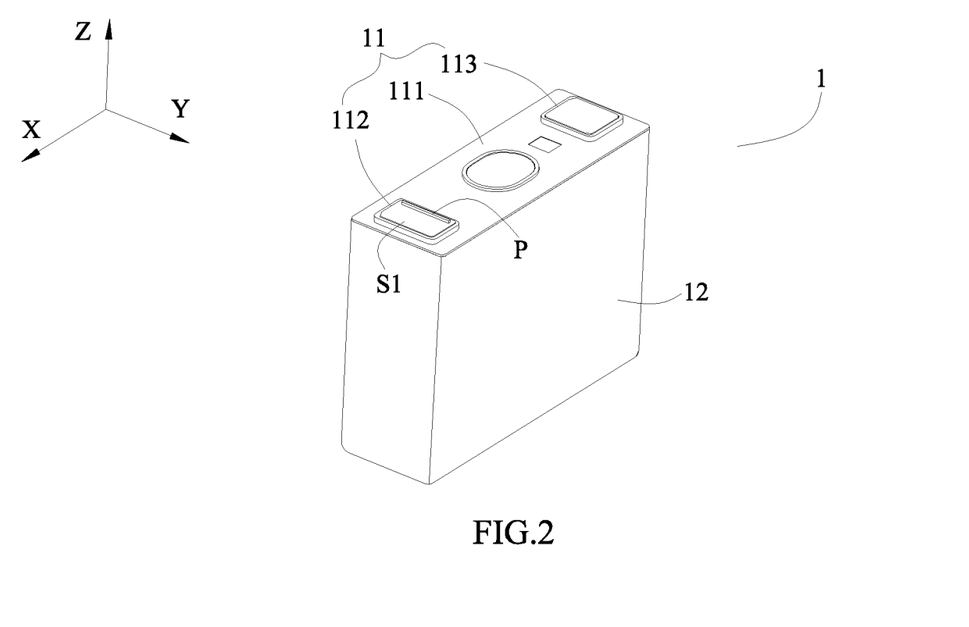
FIG. 2 is a schematic view of a secondary battery shown in FIG. 1.

Referring to FIG. 2, the secondary battery 1 can be a prismatic rechargeable battery; certainly, the secondary battery 1 also can have other shapes. Correspondingly, the case 12 can have a hexahedral shape, a cavity is formed in the case 12, and the electrode assembly 13 can be assembled into the case 12 via the opening of the case 12.

The electrode assembly 13 further comprises a separator separating the first electrode plate and the second electrode plate. The first electrode plate and the second electrode plate are opposite in polarity. Each of the first electrode plate and the second electrode plate comprises the current collector and an active material coated on the surface of the current collector, the current collector can be metal foil.

The first electrode terminal 112 extends into the case 12 via the first terminal hole 1111, and is electrically connected with the electrode assembly 13 in the case 12; the second electrode terminal 113 extends into the case 12 via the second terminal hole 1112, and is electrically connected with the electrode assembly 13 in the case 12.

Preferably, the first electrode plate is the negative electrode plate, and the current collector of the first electrode plate is made of copper in general; correspondingly, the second electrode plate is the positive electrode plate, and the current collector of the second electrode plate is made of aluminum in general. Because it is difficult to welding different metals, especially copper and aluminum, the first electrode terminal 112 is preferably made of copper and the second electrode terminal 113 is preferably made of aluminum.

The first electrode plate can be electrically connected with the first electrode terminal 112 via an adapter piece, the second electrode plate can be electrically connected with the second electrode terminal 113 via another adapter piece. The cap plate 111 is preferably made of the insulating material, so the two adapter pieces can be directly attached to the cap plate 111, and there is no need to provide an insulating member between the cap plate 111 and the adapter piece, which can save space.

Finally, a battery module according to a third aspect of the present disclosure will be described.

Referring to FIGS. 1-10, a battery module according to the present disclosure comprises a first connecting piece 2, a second connecting piece 3 and the secondary batteries 1 according to the second aspect of the present disclosure. The first connecting piece 2 includes a first connecting portion 21 and a second connecting portion 22; the first connecting portion 21 is attached to the upper surface S1 of the first electrode terminal 112 of the battery cap assembly 11 of one secondary battery 1 and welded with the protrusion P of the first electrode terminal 112 of the battery cap assembly 11 of the one secondary battery 1, the second connecting portion 22 is welded with the second protruding portion 1131 of the second electrode terminal 113 of the battery cap assembly 11 of another secondary battery 1 to form the welding portion M, and the projection of the welding portion M in the up-down direction Z is positioned in the cross-section of the second base portion 1132 of the second electrode terminal 113 of the battery cap assembly 11 of the another secondary battery 1.

The secondary batteries 1 are arranged in a row, two adjacent secondary batteries 1 can be electrically connected by one connecting piece (such as the first connecting piece 2).

Figure 4:
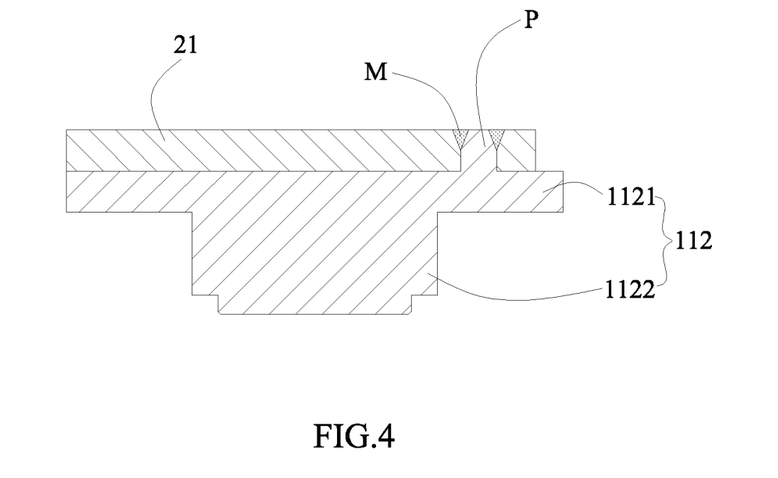
FIG. 4 is a schematic view of a first connecting piece and a first electrode terminal after welded.

The process of assembling the battery module is as follows: firstly, arranging the secondary batteries 1 in a row; secondly, attaching the first connecting portion 21 of the first connecting piece 2 to the upper surface S1 and the protrusion P of the first electrode terminal 112 of the battery cap assembly 11 of one secondary battery 1, and attaching the second connecting portion 22 to the top surface of the second protruding portion 1131 of the second electrode terminal 113 of the battery cap assembly 11 of another secondary battery 1; thirdly, referring to FIG. 4, welding along a contacting boundary between the first connecting portion 21 and the protrusion P, thereby fixing the first connecting piece 2 to the one secondary battery 1; referring to FIG. 5, connecting the second connecting portion 22 with the second protruding portion 1131 of the second electrode terminal 113 of the battery cap assembly 11 of the another secondary battery 1 directly by laser penetration welding; finally, repeating aforementioned steps, and circularly welding a plurality of connecting pieces (such as the second connecting piece 3, a third connecting piece and the like) to connect all the secondary batteries 1.

In the battery module according to the present disclosure, the protrusion P and the first connecting portion 21 of the first connecting piece 2 are arranged side by side, so the protrusion P will not increase the height of the battery module; at the same time, the first connecting portion 21 of the first connecting piece 2 is fixed to the protrusion P by butt welding, and there is no need to fix the first connecting portion 21 of the first connecting piece 2 to the upper surface S1 of the first electrode terminal 112 by laser penetration welding, which can lower the requirement of a thickness of the first electrode terminal 112, decrease the thickness of the first electrode terminal 112 and save material, reduce the total height of the first electrode terminal 112 and the first connecting piece 2 assembled together, improve the energy density of the battery module. In addition, the second protruding portion 1131 of the second electrode terminal 113 is directly connected with the second connecting portion 22 by laser penetration welding, therefore, it only needs to ensure that the first connecting portion 21 of the first connecting piece 2 is fitted with the protrusion P in the process of assembling the first connecting piece 2; even if the dimension tolerances of the secondary batteries 1 accumulate, the second protruding portion 1131 of the second electrode terminal 113 will not limit the positioning and assembling of the first connecting piece 2, which can ensure the connecting strength between the first connecting piece 2 and two secondary batteries 1, and increase cycle life of the secondary battery 1 and the battery module.

Preferably, the first electrode terminal 112 is made of copper, the second electrode terminal 113 is made of aluminum, and the cross-sectional area of the first base portion 1122 is smaller than the cross-sectional area of the second base portion 1132.

The protrusion P is provided on the upper surface S1 of the first electrode terminal 112 and fixed to the first connecting portion 21 of the first connecting piece 2 by butt welding; compared to the traditional laser penetration welding, the butt welding can effectively decrease the heat generated in the process of welding and avoid the sealing member between the first electrode terminal 112 and the cap plate 111 being damaged by high temperature. In addition, compared to aluminum, copper needs more energy and generates more heat in the process of welding, so the first electrode terminal 112 made of copper needs to choose the butt welding generating few heat.

Because the electrical resistance of copper is lower than the electrical resistance of aluminum, based on the premise that the overcurrent ability of the first electrode terminal 112 and the overcurrent ability of the second electrode terminal 113 are consistent, the cross-sectional area of the first base portion 1122 of the first electrode terminal 112 can be decreased, which can reduce weight of the secondary battery 1 and improve energy density. At the same time, the price of copper is higher than the price of aluminum, so it can save amount of copper and reduce cost.

Figure 1:
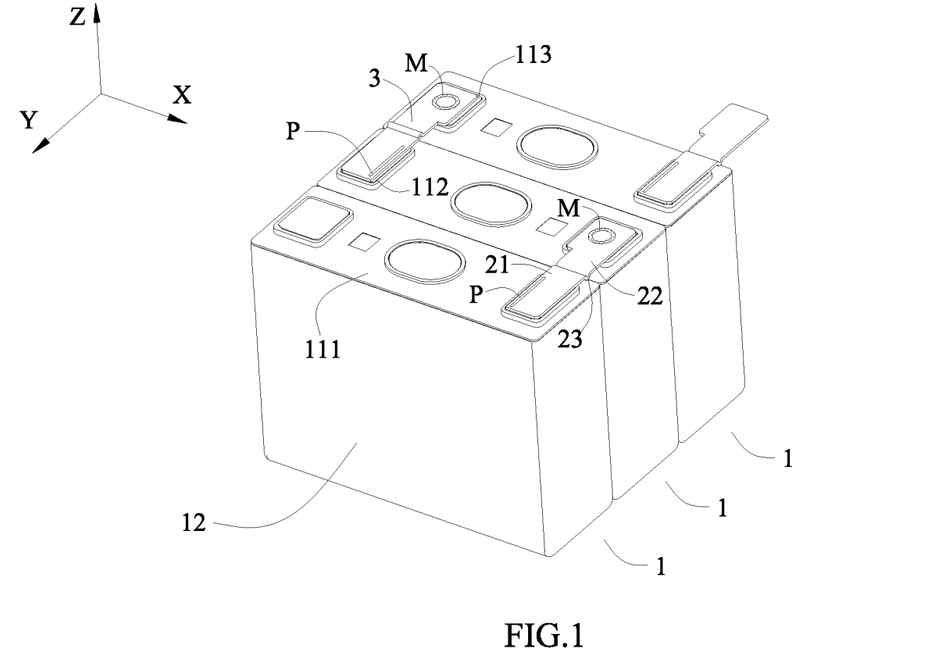
FIG. 1 is a schematic view of an embodiment of a battery module according to the present disclosure.
Figure 6:
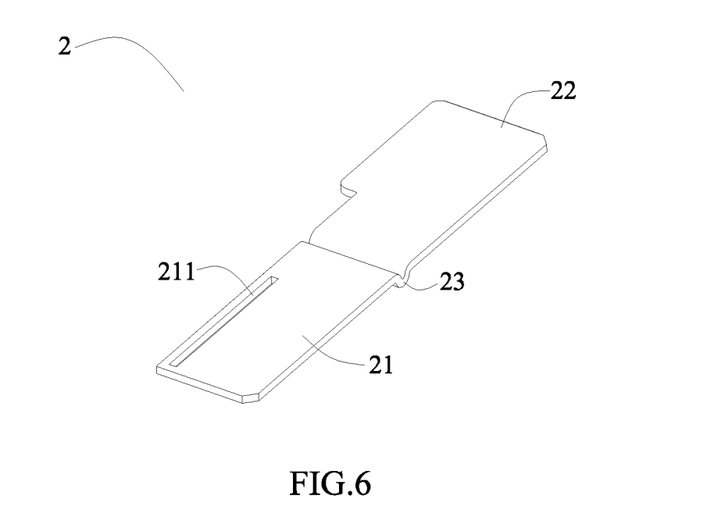
FIG. 6 is a schematic view of the first connecting piece of the battery module according to the present disclosure.
Figure 7:
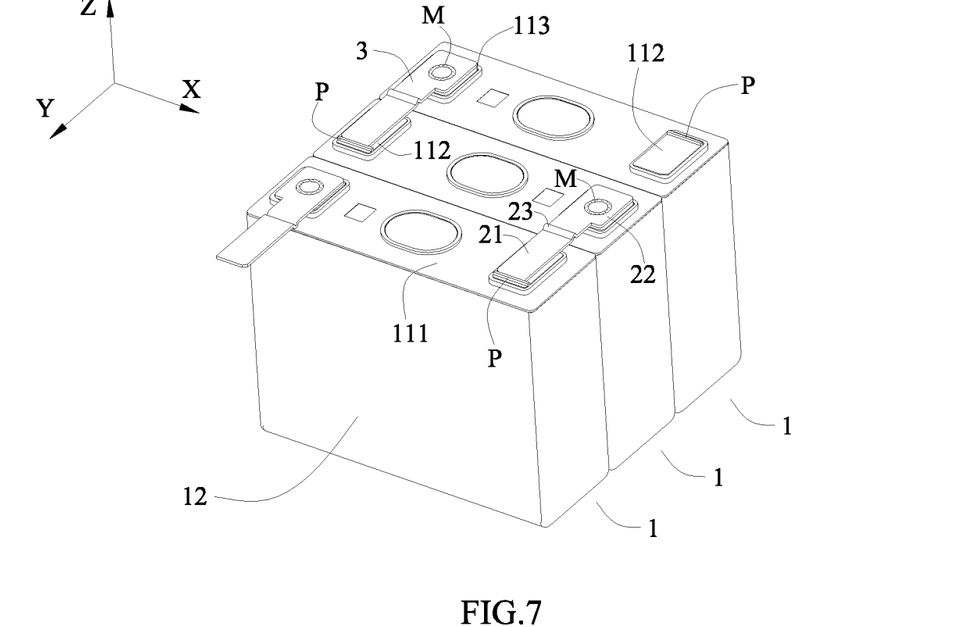
FIG. 7 is a schematic view of another embodiment of the battery module according to the present disclosure.
Figure 8:
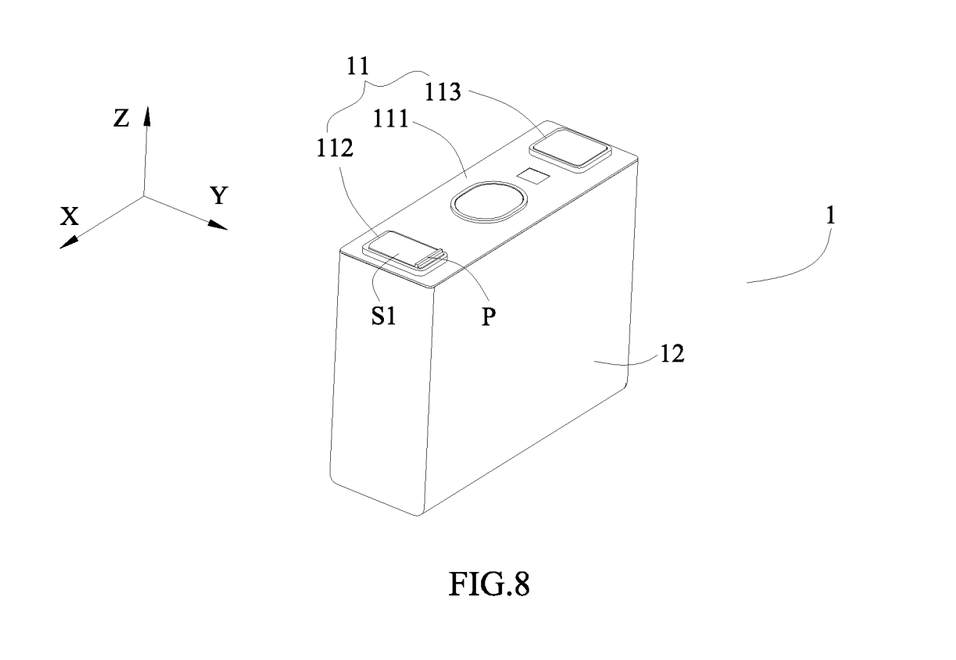
FIG. 8 is a schematic view of the secondary battery shown in FIG. 7.
Figure 9:
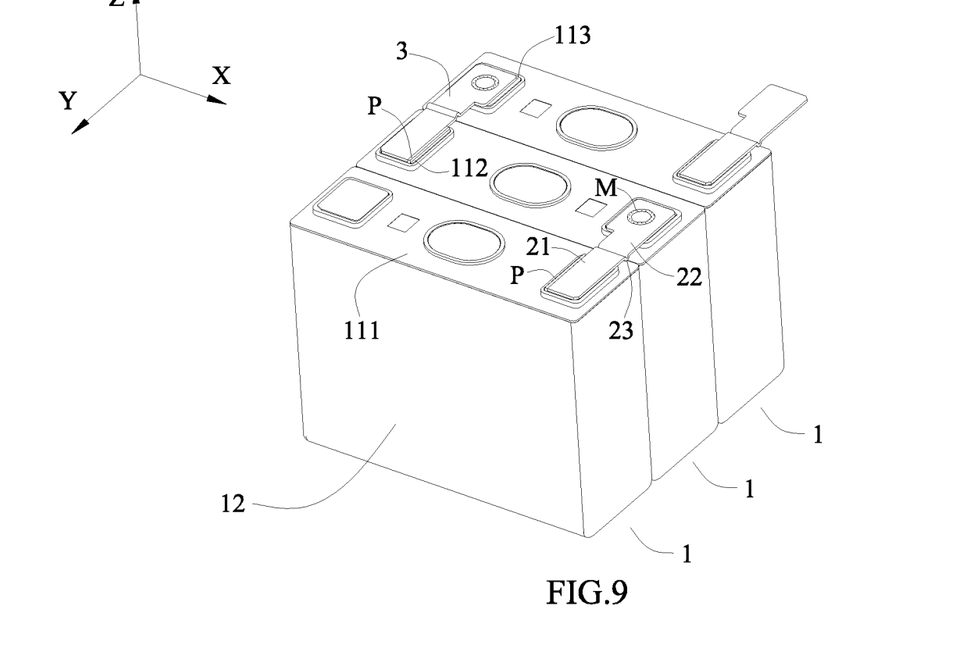
FIG. 9 is a schematic view of still another embodiment of the battery module according to the present disclosure.
Figure 10:
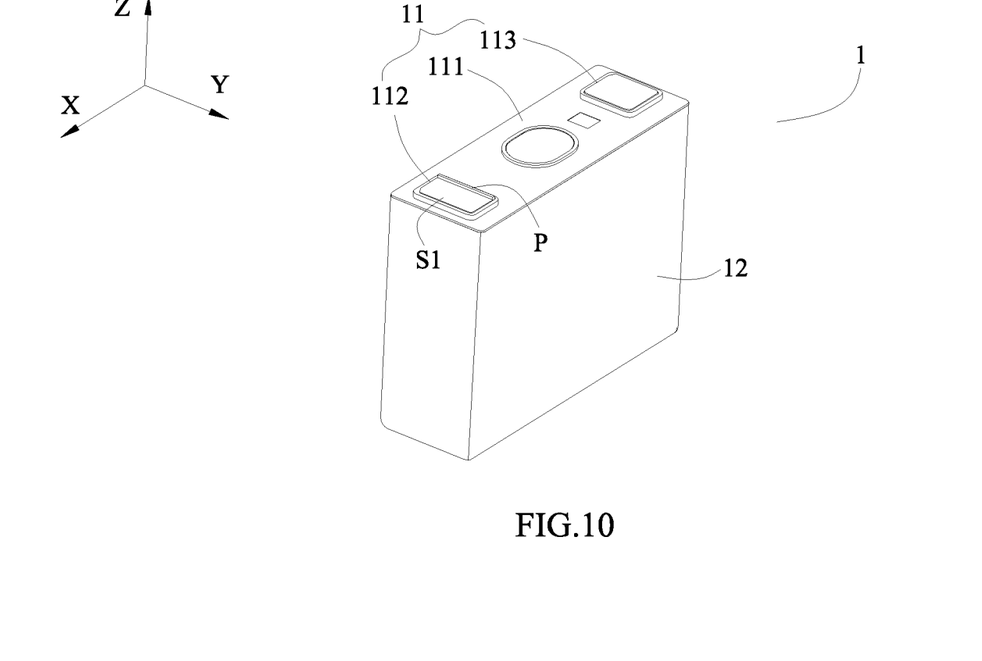
FIG. 10 is a schematic view of the secondary battery shown in FIG. 9.

Referring to FIG. 7 and FIG. 9, a side surface of the first connecting portion 21 of the first connecting piece 2 can be directly attached to the protrusion P, and the welding is along the contacting boundary between the first connecting portion 21 and the protrusion P Certainly, referring to FIG. 1 and FIG. 6, the first connecting portion 21 preferably includes a through-hole 211 fitted with the protrusion P of the one secondary battery 1, the protrusion P of the one secondary battery 1 can be fixed to the through-hole 211 by laser welding. By providing the through-hole 211, it can increase a length of welding seam between the first connecting portion 21 and the protrusion P, and improve welding strength.

Figure 5:
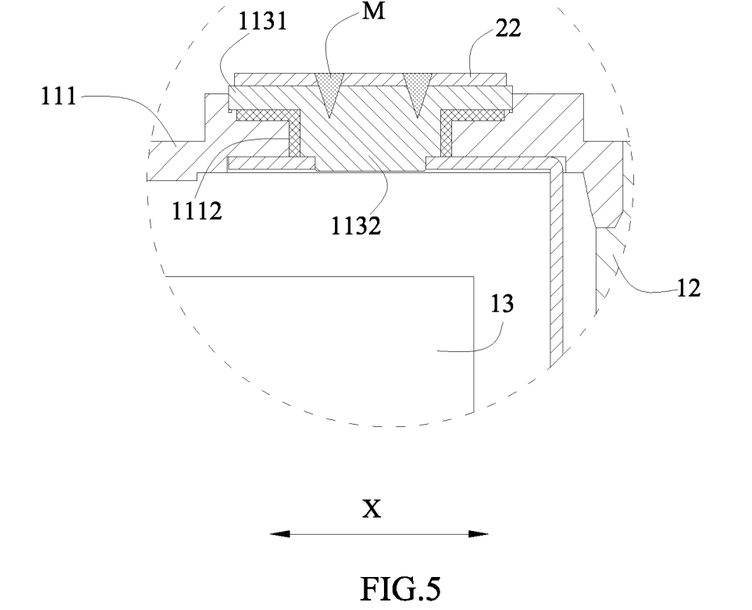
FIG. 5 is a schematic view of the first connecting piece and a second electrode terminal after welded.

Referring to FIG. 5, the second connecting portion 22 is fixed to the second protruding portion 1131 of the second electrode terminal 113 of the battery cap assembly 11 of the another secondary battery 1 by laser penetration welding and forms the welding portion M, the projection of the welding portion M in the up-down direction Z is positioned in the cross-section of the second base portion 1132 of the second electrode terminal 113 of the battery cap assembly 11 of the another secondary battery 1, in other words, in the process of laser penetration welding, a position emitting the laser faces the second base portion 1132 in the up-down direction Z. Because the second base portion 1132 needs to pass through the second terminal hole 1112, it has a large thickness; in order to reduce the height of the secondary battery 1, the thickness of the second protruding portion 1131 protruding above the cap plate 11 needs to be decreased maximally. In order to ensure the connecting strength between the second connecting portion 22 and the second electrode terminal 113, the welding depth of the laser penetration welding needs to be sufficient; if the welding portion M is formed at an edge of the second protruding portion 1131 beyond the second base portion 1132, the second protruding portion 1131 may be melted through in the process of welding, which will damage the sealing member and the cap plate 111, lead to low welding strength. Therefore, in the process of laser penetration welding, the position emitting the laser needs to face the second base portion 1132 in the up-down direction Z, so that the projection of the welding portion M in the up-down direction Z is positioned in the cross-section of the second base portion 1132, and ensures welding strength.

A thickness of the first connecting piece 2 is equal to a height of the protrusion P of the one secondary battery 1 in the up-down direction Z, so the protrusion P will not increase the height of the battery module.

Referring to FIG. 1 and FIG. 6, the first connecting piece 2 further includes a third connecting portion 23 in the shape of arch, the third connecting portion 23 connects the first connecting portion 21 and the second connecting portion 22. The third connecting portion 23 in the shape of arch can adjust a height difference between the first connecting portion 21 and the second connecting portion 22 in the up-down direction Z.

What is claimed:

1. A battery module, comprising a first connecting piece, a second connecting piece and secondary batteries;
   wherein
   each secondary battery comprises a case, an electrode assembly and a battery cap assembly;
   the case has an opening in a top thereof;
   the battery cap assembly is fixed to the case and seals the opening of the case;
   the electrode assembly is received in the case and comprises a first electrode plate and a second electrode plate;
   the battery cap assembly comprises a cap plate, a first electrode terminal and a second electrode terminal;
   the cap plate includes a first terminal hole and a second terminal hole;
   at least a part of the first electrode terminal protrudes above the cap plate;
   the second electrode terminal includes a second protruding portion protruding above the cap plate and a second base portion connected with the second protruding portion, the second base portion extends into the second terminal hole, a cross-sectional area of the second protruding portion is larger than a cross-sectional area of the second terminal hole;
   a protrusion is provided on an upper surface of the first electrode terminal;
   the first electrode terminal is electrically connected with the first electrode plate, the second electrode terminal is electrically connected with the second electrode plate;
   the first connecting piece includes a first connecting portion and a second connecting portion; the first connecting portion is attached to the upper surface of the first electrode terminal of the battery cap assembly of one secondary battery and welded with the protrusion of the first electrode terminal of the battery cap assembly of the one secondary battery; the second connecting portion is welded with the second protruding portion of the second electrode terminal of the battery cap assembly of another secondary battery to form a welding portion, and a projection of the welding portion in an up-down direction is positioned in a cross-section of the second base portion of the battery cap assembly of the another secondary battery, and the welding portion extends into the second base portion,
   an interface between the second connecting portion and the second electrode terminal is a plane and the entirety of the second electrode terminal is positioned below the second connecting portion.

2. The battery module according to claim 1, wherein the first connecting portion includes a through-hole fitted with the protrusion of the one secondary battery, the protrusion of the one secondary battery is fixed to the through-hole by laser welding.

3. The battery module according to claim 1, wherein a thickness of the first connecting piece is equal to a height of the protrusion of the one secondary battery in the up-down direction.

4. The battery module according to claim 1, wherein the second base portion is connected with a bottom surface of the second protruding portion and extends downwardly.

5. The battery module according to claim 1, wherein the first electrode terminal includes a first protruding portion protruding above the cap plate and a first base portion connected with a bottom surface of the first protruding portion, the first base portion extends downwardly and extends into the first terminal hole.

6. The battery module according to claim 5, wherein the first electrode terminal is a negative electrode terminal and made of copper, the second electrode terminal is a positive electrode terminal and made of aluminum, and a cross-sectional area of the first base portion is smaller than a cross-sectional area of the second base portion.

7. The battery module according to claim 5, wherein a thickness of the first protruding portion is equal to a thickness of the second protruding portion in the up-down direction.

8. The battery module according to claim 1, wherein a cross-section of the protrusion is a rectangle and the protrusion extends along a transverse direction of the cap plate; or the cross-section of the protrusion is a rectangle and the protrusion extends along a longitudinal direction of the cap plate.

9. The battery module according to claim 3, wherein the protrusion and the first connecting portion of the first connecting piece are arranged side by side, a side surface of the first connecting portion is directly attached to the protrusion.

10. The battery module according to claim 9, wherein in the up-down direction, an upper surface of the first connecting portion is flush with an upper surface of protrusion of the first electrode terminal.

11. The battery module according to claim 1, wherein the cap plate is made of insulating material.

12. The battery module according to claim 1, wherein the first connecting piece further comprises a third connecting portion in the shape of arch, the third connecting portion connects the first connecting portion and the second connecting portion.

* * * * *